(12) United States Patent
Chitnis et al.

(10) Patent No.: US 8,625,032 B2
(45) Date of Patent: Jan. 7, 2014

(54) VIDEO CAPTURE FROM MULTIPLE SOURCES

(75) Inventors: Kedar Chitnis, Bangalore (IN); Brijesh Rameshbhal Jadav, Bangalore (IN); Brian Okchon Chae, Alpharetta, GA (US); Manjunath Rudranna Hadli, Belguam (IN); David Edward Smith, Jr., Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 162 days.

(21) Appl. No.: 13/176,327

(22) Filed: Jul. 5, 2011

(65) Prior Publication Data

US 2013/0010198 A1    Jan. 10, 2013

(51) Int. Cl.
*H04N 9/67* (2006.01)
*H04N 7/00* (2011.01)

(52) U.S. Cl.
USPC .......................................... 348/660; 348/474

(58) Field of Classification Search
None
See application file for complete search history.

(56) References Cited

U.S. PATENT DOCUMENTS

| 7,000,244 B1 * | 2/2006 | Adams et al. | 725/131 |
| 2009/0256965 A1 * | 10/2009 | Moote et al. | 348/564 |

OTHER PUBLICATIONS

"TMS320DM816x DaVinci Digital Media Processors", SPRS614, Texas Instruments Incorporated, Mar. 2011, pp. 1-312.
"The TMS320DM642 Video Port Mini-Driver", Application Report SPRA918A, Texas Instruments Incorporated, Aug. 2003, pp. 1-35.
"TVP5158, TVP5157, TVP5156 Four-Channel NTSC/PAL Video Decoders With Independent Scalers, Noise Reduction, Auto Contrast, and Flexible Output Formatter for Security and Other Multi-Channel Video Applications Data Manual", Literature No. SLELS243E, Texas Instruments Incorporated, Jul. 2009, Revised Mar. 2011, pp. 1-108.
Purushotam Kumar et al, "Frame List Processing for Multiple Video Channels", U.S. Appl. No. 13/095,445, filed Apr. 27, 2011, pp. 1-25.

* cited by examiner

*Primary Examiner* — Jefferey Harold
*Assistant Examiner* — Michael Teitelbaum
(74) *Attorney, Agent, or Firm* — Robert D. Marshall, Jr.; W. James Brady; Frederick J. Telecky, Jr.

(57) ABSTRACT

A method for capturing video frames from a plurality of video channels is provided. A list of a least two descriptors is formed for each of the plurality of video channels in a memory accessible to a direct memory access (DMA) engine, wherein each of the two or more descriptors for each channel is programmed to define a storage location for a sequential frame of video data for the channel. A sequence of video frames is received from the plurality of video channels, wherein for each channel, video frames are received at a frame rate for that channel. A DMA engine uses descriptors from the list to store video frames as they are received. The list is updated periodically to replace used descriptors.

9 Claims, 7 Drawing Sheets

VIDEO CAPTURE FROM MULTIPLE SOURCES

CLAIM OF PRIORITY UNDER 35 U.S.C. 120

The present application claims priority to and incorporates by reference U.S. application Ser. No. 13/095,445, filed Apr. 27, 2011, entitled "Frame List Processing for Multiple Video Channels."

FIELD OF THE INVENTION

This invention generally relates to capturing video streams from multiple sources, and more particularly to the use of a direct memory access engine to capture the multiple streams.

BACKGROUND OF THE INVENTION

With ever increasing need for higher computational power, multiple central processing units (CPUs), also referred to as cores, are being integrated to form a single system on a chip (SoC). In such SoCs, each of the cores could be different (i.e. a heterogeneous system) and could host different operating systems but share the same memory and peripherals.

With sufficient processing power, multiple sources of video may be coupled to the SoC which may then receive multiple video streams that may be processed by the cores on the SoC, stored in memory coupled to the SoC, and displayed on a monitor coupled to the SoC. Alternatively, the SoC may be coupled to a network, either wired or wireless, and transmit the video streams to a remote location.

A video multiplexor may be used to connect to multiple sources of video, such as a set of cameras. For example, two TVP5158, Four-Channel NTSC/PAL Video Decoders, available from Texas Instruments, may be coupled to eight cameras and provide a multiplexed stream of eight video streams to the SoC. The TVP5158 chip converts the analog video signals to digital data and multiplexes the data on a line-by-line basis or pixel-by-pixel basis and sends the line-multiplexed or pixel-multiplexed data to a video port interface on the SoC. This video port is capable of de-multiplexing the multiplexed streams and storing the de-multiplexed data to individual channel frame buffers in external memory. Typical implementations of capturing this data involve getting an interrupt from the Video port when each frame for a each channel is received.

BRIEF DESCRIPTION OF THE DRAWINGS

Particular embodiments in accordance with the invention will now be described, by way of example only, and with reference to the accompanying drawings.

Figure 1:
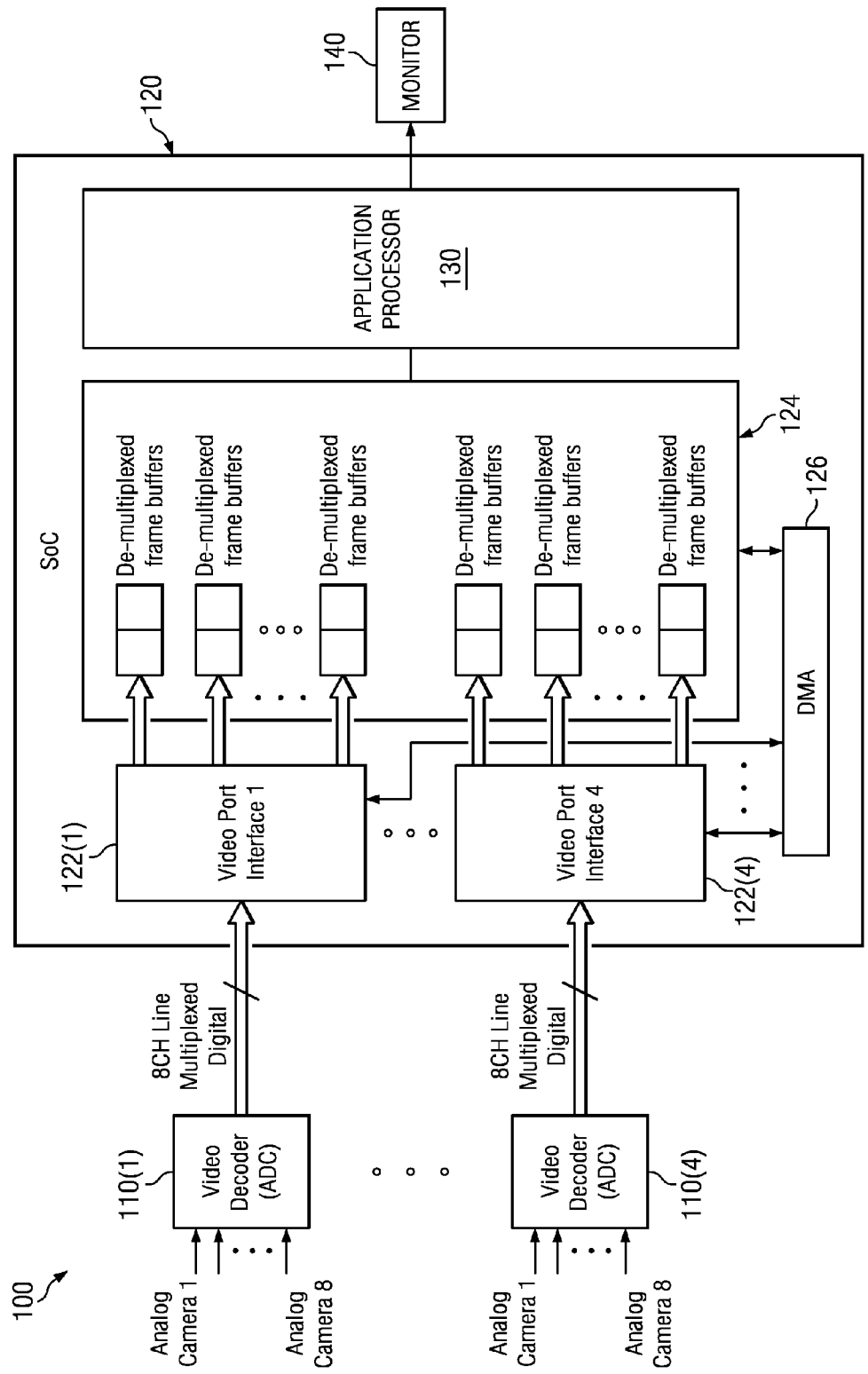
FIG. 1 is a block diagram that illustrates a system on a chip (SoC) coupled to a set of video cameras that embodies the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A system on a chip (SoC) may receive a stream of multiplexed video streams on a single input port. For example, eight cameras may be connected to a single Video Decoder (Analog-to-Digital, ADC) chip. This chip converts the analog video signals to digital data and multiplexes the data on a line-by-line basis or pixel-by-pixel basis and sends the line-multiplexed or pixel-multiplexed data to a video port interface on the SoC. This video port is capable of de-multiplexing the multiplexed streams and storing the de-multiplexed data to individual channel frame buffers in external memory.

Embodiments of this invention capture these de-multiplexed frames in a resource efficient manner. In this description, the term "resource" refers to a number of interrupt lines needed and software overhead due to the number of interrupts per second that need to be handled.

Previous implementations of capturing this data would involve getting an interrupt from the video input port each time a frame for a particular channel is received. When the frame complete interrupt is received, a current frame buffer is released to an application program for processing and a new frame buffer is provided to the video input port for capturing next frame. One interrupt line is needed for every channel. For example, for an SoC that has four video ports each capturing up to eight channels of video, thirty-two interrupt lines would be needed in order to identify the source of each completed capture frame. This is a very high resource requirement to have on the hardware.

One solution to this interrupt resource problem would be to multiplex all frame complete signals to a single interrupt line. In this case, when an interrupt is received a software routine would need to check up to thirty-two register bit fields and identify the source of the generated interrupt. Thus, even though the hardware resource requirements are reduced with this approach, more software processing overhead is added.

For example, when capturing thirty-two channels via four video ports at 60 fields/second, a total of 1920 interrupts per second would be received. Each interrupt involves processor context switching from an application to an interrupt context, thus interrupting the processing application more frequently and also adding context switching overhead. Frequent context switching will also cause code/data cache inefficiencies due to frequent switching of code and data and thus lower system performance. Embodiments of this invention reduce the hardware resources (interrupts) required and makes the hardware resource requirement finite no matter how many channels are being captured (32 or 64 or 128). Previous approaches linearly increase the hardware interrupt requirements as channels increase.

Thus, previous approaches linearly increase the software overhead as the number of channels increase, for example from 32 to 64 or to 128 channels. An embodiment of the invention reduces the software overhead for interrupt context switching and makes the software overhead finite, regardless of how many channels are being captured. Thus, embodiments of the invention allow a system to be scalable from one channel to 128 or more channels, while keeping the hardware resource requirements and software overhead finite.

FIG. 1 is a block diagram that illustrates a video system 100 that includes to a set of video cameras coupled to video multiplexors 110(1)-110(4). For example, two TVP5158, Four-Channel NTSC/PAL Video Decoders, available from Texas Instruments, may be coupled to eight cameras and provide a multiplexed stream of eight video streams to SoC 120. The TVP5158 chip converts the analog video signals to digital data and multiplexes the data on a line-by-line basis and sends the line-multiplexed data to one of four video port interfaces 122(1)-122(4) on the SoC. Each video port is capable of de-multiplexing the multiplexed streams and storing the de-multiplexed data to individual channel frame buffers in memory subsystem 124. Memory subsystem 124 may be located within SoC 120 or it may be partially or totally outside of SoC 120. Various embodiments of memory subsystem 124 may include one or more different memory modules, which may have different access times. Application processor 130 is coupled to memory 124 and is notified as demultiplexed buffers are produced, as will be described in more detail below. Application processor 130 processes the various video streams using one or more processing applications to produce a composited image that is output to monitor 140. Monitor 140 may be a single display device or may be an array of devices, depending on the configuration of video system 100. Alternatively, the SoC may be coupled to a network, either wired or wireless, and transmit the video streams to a remote location.

The various processing applications use known techniques for manipulating the video streams to size, position, filter, enhance, and compose the images. The processing applications may also use known techniques to perform movement detection, facial recognition, etc. The specific operation of the processing applications will not be described in detail herein.

For example, SoC 120 may be selected from the TMS320DM816x family of digital media processors that is available from Texas Instruments (TI). The DM816x DaVinci™ Digital Media Processors are a highly-integrated, programmable platform that leverages TI's DaVinci™ technology to meet the processing needs of many types of applications, such as: Video Encode/Decode/Transcode/Transrate, Video Security, Video Conferencing, Video Infrastructure, Media Server, and Digital Signage, for example. Various aspects of the DM816x processor family is described in more detail in "TMS320DM816x DaVinci Digital Media Processors Data Sheet," SPRS614, which is incorporated by reference herein.

Direct memory access (DMA) engine 126 is coupled to the video ports and to memory 124 and may be programmed using descriptors to transfer frame data from the video ports to the frame buffers located in memory 124. DMA engine uses several types of descriptors: data descriptor, control descriptor, and configuration descriptor.

A data descriptor is a memory structure used to describe a desired memory transaction to or from a client. The descriptor at a minimum gives an address location for the memory portion of the transfer, the channel to use for this transaction and the size of the transaction. The data descriptor can also contain attributes to be passed down to the client or be linked to another data descriptor to form a larger frame from many smaller frames.

In the descriptor based control mode a list is a group of descriptors that makes up a set of DMA transfers that need to be completed.

The regular list is just a single list for which the DMA will execute each descriptor once and fire an interrupt when the list has completed. A regular list may contain any kind of descriptor and be of any size.

Each video port 122(1)-122(4) has the ability to operate on multiple capture output frame descriptors via a list. The list is a mechanism provided by DMA engine 126 to program multiple frame buffer addresses for different channels to the hardware without software intervention. For example, each descriptor includes a channel identification (chID) and a buffer address.

Each video port has the ability to output a frame descriptor to a user specified address for completed or captured frames. The completed frame descriptors are specified by the processing application for use by the video port. Each video port also has the ability to switch this user specified completed descriptor write address and use another user specified completed descriptor address. Each video port also has the ability to provide a status of the number of completed frame descriptors each time the descriptor address switch is done.

Figure 2:
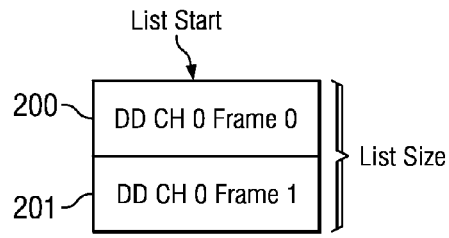
FIGS. 2-4 illustrate frame descriptor lists that are used by the SoC of FIG. 1.
Figure 3:
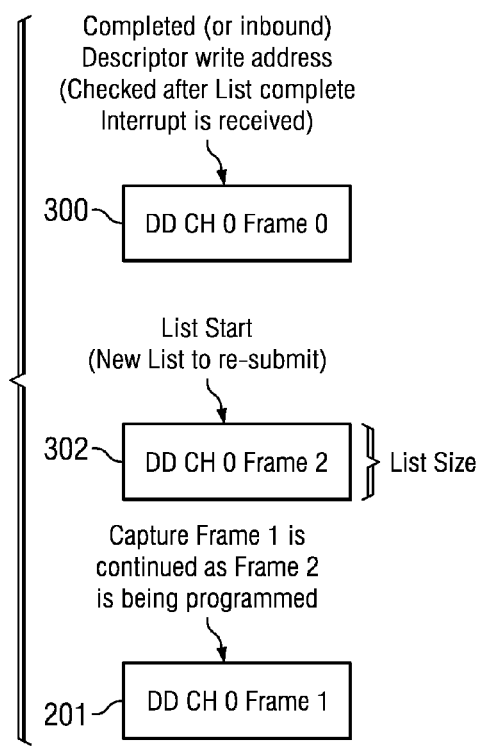
Figure 4:
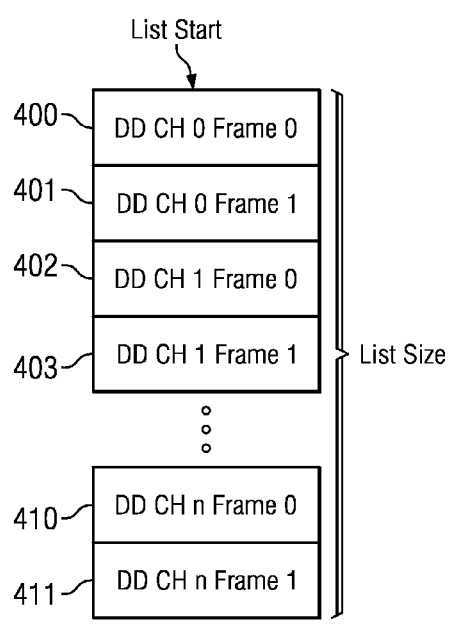

FIGS. 2-4 illustrate frame descriptors that are used by the SoC of FIG. 1. A software application referred to herein as a "capture driver" controls DMA engine 126 for the purpose of transferring captured frames of video data from video ports 122(1)-122(4) frame buffers in memory 124. The capture driver requires a special arrangement of descriptors that is called a capture list manger (CLM). An initial list that is programmed by an application program that is being executed on SoC 120 for one channel is shown in FIG. 2. Descriptor 200 is a data descriptor for channel 0 that defines a frame buffer location in memory 124 for frame 0. Descriptor 201 is a data descriptor for channel 0 that defines a frame buffer location in memory 124 for frame 1. The application program writes the location of the list in memory 124 to a list address register in DMA engine 126, followed by writing the size, type of list and list number to a list attribute register in DMA engine 126.

After starting DMA operation, the list manager (LM) consumes "CH 0 Frame 0", "CH 0 Frame 1" data descriptors. The term "consumes" means the LM removes the descriptor from the list and then when data is received for frame 0 it will begin writing data at the location mentioned in the respective descriptor. After the list is submitted a timer is programmed to trigger after a defined period of time. The timer period is selected to be shorter than it would take to fill both frame buffers defined in the initial descriptor list.

Referring now to FIG. 3, while the timer is running for the defined period of time, the video port is receiving data and writing to the frame buffer location indicated by "CH0 Frame 0" descriptor 200. Once a complete frame is written to the frame buffer in memory the descriptor is said to be "completed." It may also be referred to as an "inbound" descriptor. This inbound descriptor 300 is then written to a specific location in memory 124 that was specified by the application program. When the timer elapses, an interrupt fires and the application program goes and checks the completed descriptors. For every completed descriptor that it finds it programs a new descriptor with a new buffer address, such as new descriptor 302 that is a data descriptor for channel 0, frame 2. Channel 0 capture is still in progress using the descriptor for frame 1 that was programmed in the initial list by the application program. The software re-submits a modified list to DMA 126 with descriptor 302 for the next frame, frame 2.

FIG. 4 illustrates frame descriptors for multiple channels. The technique described in FIGS. 2 and 3 for a single channel can be easily extended for multi-channels over a given port and over multiple ports. In this example, descriptors 400, 401 are for channel 0, descriptors 402, 402 are for channel 1, and descriptors 410, 411 or for channel n. the number of channels in the descriptor list may be any amount supported by the hardware of SoC 120. For the CLM, it does not matter whether the descriptors are for the same channel and same port or for different channels and/or ports. The only difference is in the time selected for the timer interrupt. For example, if the frame rate is 60 fps, then the timer may be set to trigger after 8 ms (16/2 ms, i.e., 120 interrupts per second). This allows a check of written descriptors every 8 ms to ensure that even though capture sources may be asynchronous with each other, the CLM still receives every frame and switches to a new buffer once a full buffer is received.

Referring again to FIG. 1, DMA engine 126 provides several registers that are used by the application program to specify the location and size of descriptor lists, the location of completed descriptors, etc. Table 1 illustrates a status and control register that may be checked by the application program to determine the number of completed descriptors written since the last time the status register was cleared. This register also allows for locking and clearing the descriptor counts.

TABLE 1

Descriptor status and control register

| bits | Field name | description |
| --- | --- | --- |
| 31 | Clear_desc_count | This will clear the DESCRIPTORS_WRITTEN value and will also reset the CURRENT_DESCRIPTOR location to DESCRIPTOR_TOP. |
| 30:24 | Reserved | |
| 23:16 | Last_desc_written | The number of descriptors written to the descriptor queue when CLR_DESC_CNT was last cleared. |
| 15:8 | Reserved | |
| 7:0 | Desc_written | The number of descriptors written to the descriptor queue since it was last cleared. |

Figure 5:
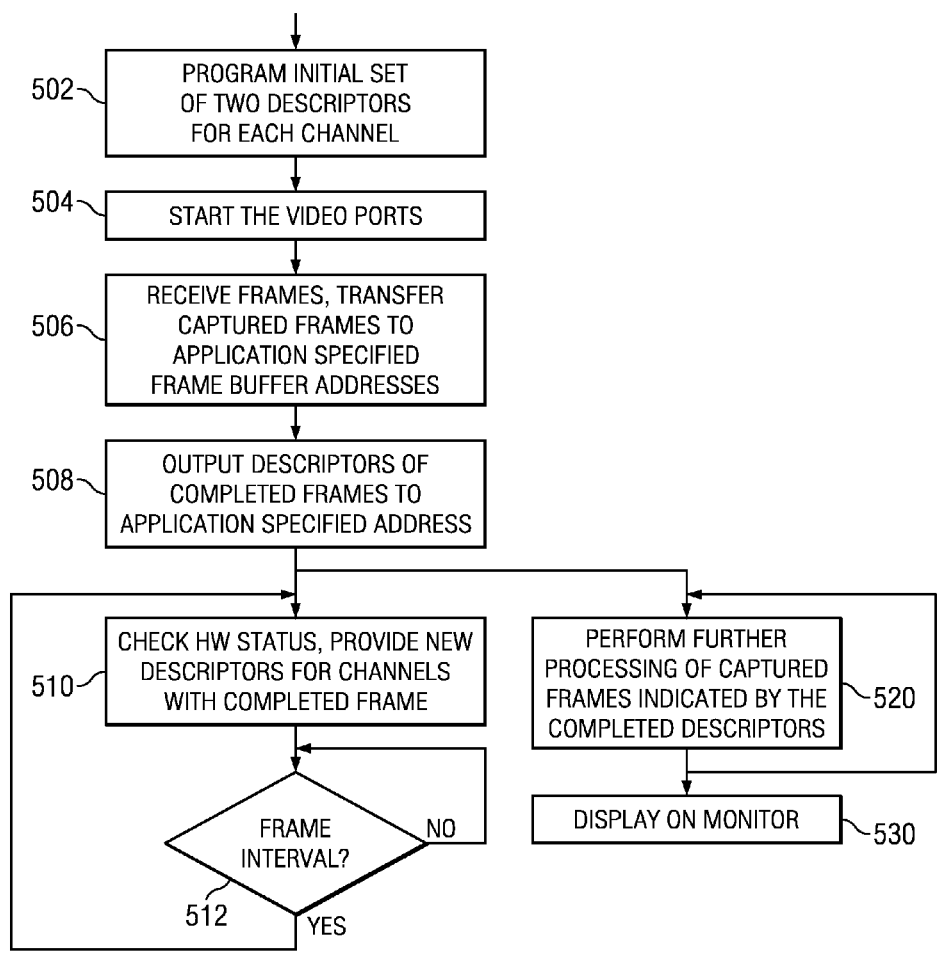
FIG. 5 is a flow diagram illustrating capture of multiple video streams.

FIG. 5 is a flow diagram illustrating capture of multiple video streams by SoC 120 of FIG. 1. The video port and DMA hardware capability may be used to implement an efficient multi-channel capture scheme. An initial set of two frame data information descriptors is programmed 502 for each channel via a hardware descriptor list as described above and illustrated in the example pseudo code of Table 2.

TABLE 2 pseudo-code for programming two frame data descriptors for each channel

```
curListId = 0;
// make a new list at address 'listAddr[curListId]'
HWLIST_init(listAddr[curListId]);
    for(chId=0; chId<MAX_CH; chId++) {
    // get 1st free buffer from application
    bufferAddr = APP_getFreeBuffer(chId);
    // add to list 1st buffer descriptor for a channel
    HWLIST_addDesc(chId, bufferAddr);
    // get 2nd free buffer from application
    bufferAddr = APP_getFreeBuffer(chId);
    // add to list 2st buffer descriptor for a channel
    HWLIST_addDesc(chId, bufferAddr);
}
curListId ^= 1; // toggle between 0 and 1
/*
'listAddr[curListId]' is the user specified memory location
where completed descriptors will be output
for this HW list submission
*/
HWLIST_setDescOutAddr(listAddr[curListId]);
/*
program the list to the HW
```

TABLE 2-continued pseudo-code for programming two frame data descriptors for each channel

```
*/
HWLIST_submit( );
```

Once the initial descriptor lists are programmed by an application program being executed by a processor within SoC 120, the video ports 122(1)-122(4) are started 504.

The video ports 122(1)-122(4) will now start receiving 506 a stream of multiplexed video frames from video decoders 110(1)-110(4) and captured video frame data will be output to the frame buffer addresses in memory 124 that were programmed into the data descriptors as illustrated by the pseudo-code in Table 2. When a complete frame is captured for a given channel, a completed frame descriptor will be output 508 to an application specified memory address, as illustrated by the pseudo-code in Table 2.

The software will then periodically check 510 the status of completed frames provided by the video ports to identify how many completed data descriptors were output to the application specified memory address. Example pseudo-code illustrating this process as shown in Table 3. For each channel that has captured a frame, as indicated by the completed frame descriptor, a new descriptor will be provided by the application for the next frame, as illustrated in the pseudo-code of Table 3. In this manner, each channel maintains a descriptor list with two frame buffer locations.

The completed descriptors are written as a list to a location defined by a "write location" register. Each time the interrupt occurs, the software may change the address in the write location register so that a separate list of completed descriptors is created for each interrupt. This may simplify the task of determining which channel's descriptors have been consumed.

TABLE 3 pseudo-code to periodically check for completed descriptors

```
// prepare for parsing recevied descriptors
HWLIST_init(listAddr[curListId]);
/*
Get number of descriptors written to listAddr[curListId]
*/
numDesc = HWLIST_getNumDesc( listAddr[curListId]);
curListId ^= 1; // toggle between 0 and 1
/*
listAddr[curListId] is location where new set of subsequent descriptors
will be written.
*/
HWLIST_setDescOutAddr(listAddr[curListId]);
// all newly received descriptors
for(descId=0; descId< numDesc; descId++) {
    // parse received descriptor and extra channel ID and frame buffer
    address
    chId = HWLIST_parseDesc(&bufferAddr);
    // provide received frame buffer address to application
    APP_putFullBuffer(chId, bufferAddr);
    // get next free buffer from application
    bufferAddr = APP_getFreeBuffer(chId);
    // replace in list new buffer descriptor for the channel
    HWLIST_addDesc(chId, bufferAddr);
}
/*
program the new list to the HW
*/
HWLIST_submit( );
```

Status checking is repeated 512 at fixed intervals of approximately one half the maximum frame interval, MAX_

FRAME_INTERVAL/2. Example, if the frame rate is 60 fps, i.e., a new frame is received every 16 ms, then status checking 510 is programmed to execute every 16/2=8 ms. This rate of checking guarantees that no frames are missed. A timer interrupt may be used as a trigger 512 to perform status checking 510.

Earlier interrupt driven video capture approaches were designed for lower channel density, typically one or two channels. When an interrupt driven implementation is scaled to 16 or 32 channel capture, there is a significant increase in software overhead in terms of interrupt context switching and hardware resource requirements in terms of number of interrupt lines that are required. Embodiments of the invention make both of these requirements finite and thus allows an application to scale from a low channel density to high channel density capture systems.

Only one timer interrupt is needed to handle captured data from all channels. This requirement of one timer interrupt remains the same no matter how many channels are being captured in the system. The number of interrupts per second for 60 fps capture streams is 1000 ms/8 ms=125 interrupts per second. These interrupts per second remain the same no matter how many channels are being captured. Thus, the interrupt rate is approximately equal to twice the frame rate. This is a significant reduction of interrupts per second. For example, an earlier implementation having 32 channels would need 32*60=1920 interrupts per second. The improved completion status approach provides almost fifteen times fewer interrupts per second.

Since the completed descriptors are checked periodically every 8 ms, it may happen that a frame has arrived but has not been released to the application, i.e worst case this technique may add an additional 8 ms latency to the video processing pipeline. This latency addition however, by itself, is not significant in most use case scenarios. For application where latency is critical, the latency may be reduced by reducing the periodic sampling interval from 8 ms to 4 ms, for example.

Using this scheme, it is possible to receive source channels that are of different size and/or different frame rates, as long as the timer interrupt is set at half of the smallest source frame interval.

Once a frame is captured and a completed descriptor has been written 508, the application program may pass the completed descriptors to a processing application to perform 520 resizing, positioning, filtering, enhancements, and composition of the images. The processing applications may also use known techniques to perform movement detection, facial recognition, etc. The specific operation of the processing applications will not be described in detail herein. By using the descriptors to indicate where each frame buffer is stored in the memory system the frame data does not need to be moved. Each processing application simply passes the descriptor for the data to the next processing application that needs to access the frame data. Once the frame data has been completely processed and displayed, the memory area used for the frame buffer may be recycled.

The processed video streams may then be displayed 530 on a monitor that may be a single display device or may be an array of devices, depending on the configuration of video system. Alternatively, the processed video stream may be coupled to a network, either wired or wireless, and transmitted to a remote location.

While an initial descriptor list having two descriptors for each channel have been described herein, other embodiments of DMA engines may by configured to accept more than two descriptors per channel. In such embodiments, the interrupt timer period may be extended accordingly.

Figure 6:
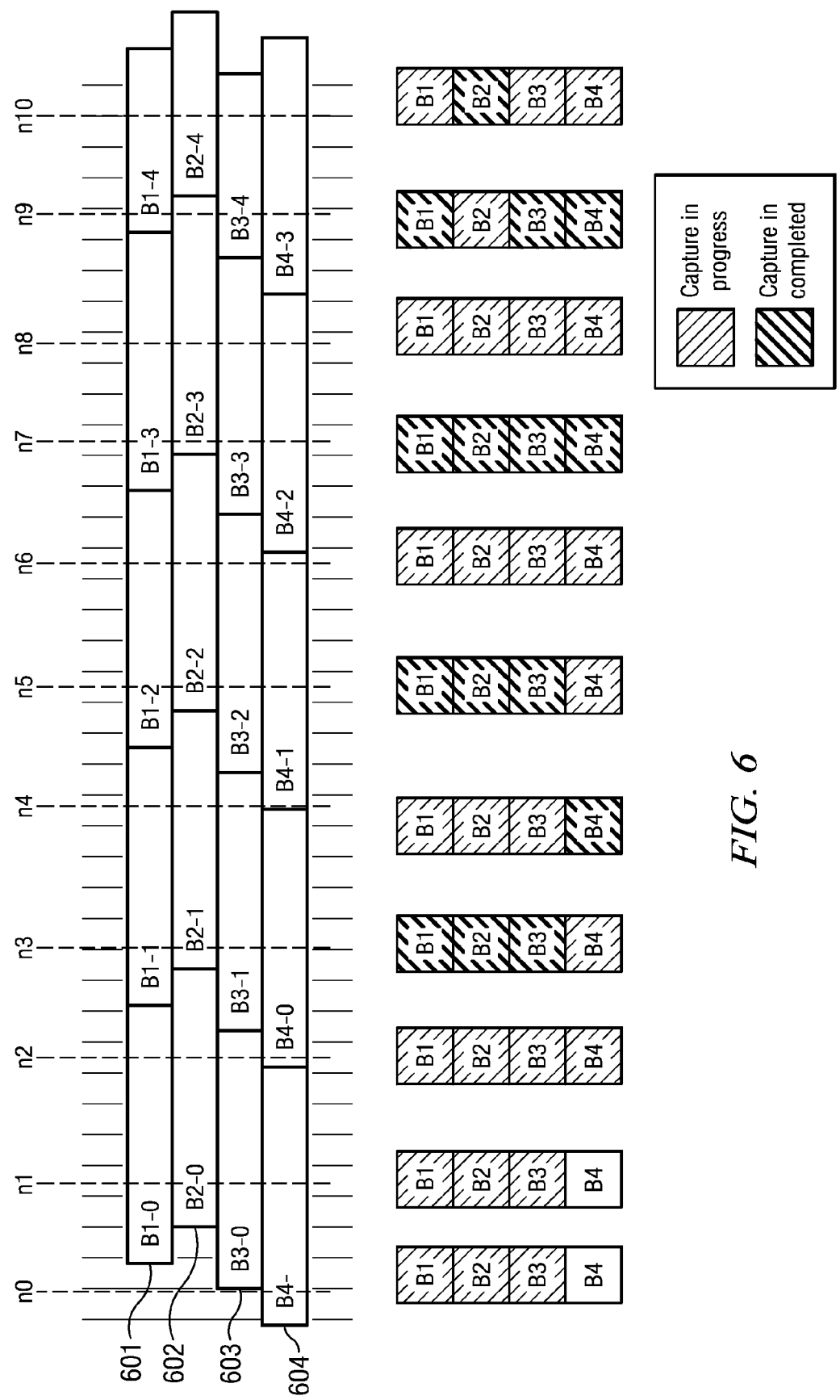
FIG. 6 is a timing diagram illustrating capture of four channels of video by the SoC of FIG. 1.

FIG. 6 is a timing diagram illustrating capture of four channels of video by the SoC of FIG. 1. While four channels are illustrated here, the same sequence may be extended to as many channels as the hardware of SoC 120 supports. n0,n1, n2 . . . n10 are timer interrupts when the application program software checks for completed/captured descriptors, such as completed descriptor 300 illustrated in FIG. 3. Each line 601-604 represents one channel, for which a video stream is being demultiplexed and transferred by DMA engine 126 into a frame buffer specified by a data descriptor. As each frame capture is completed, capture continues since two buffers are programmed during start up. On each interrupt n0-n10, a next buffer for capture is programmed for each channel in which one of the two buffers is filled and a callback is generated.

For example, on interrupt n3, buffer B1, B2, B3 are completed whereas B4 capture is still in progress. Therefore, in response to interrupt n3 a new descriptor will be programmed for channel 1, channel 2 and channel 3 and added to the pending descriptor list.

Figure 7:
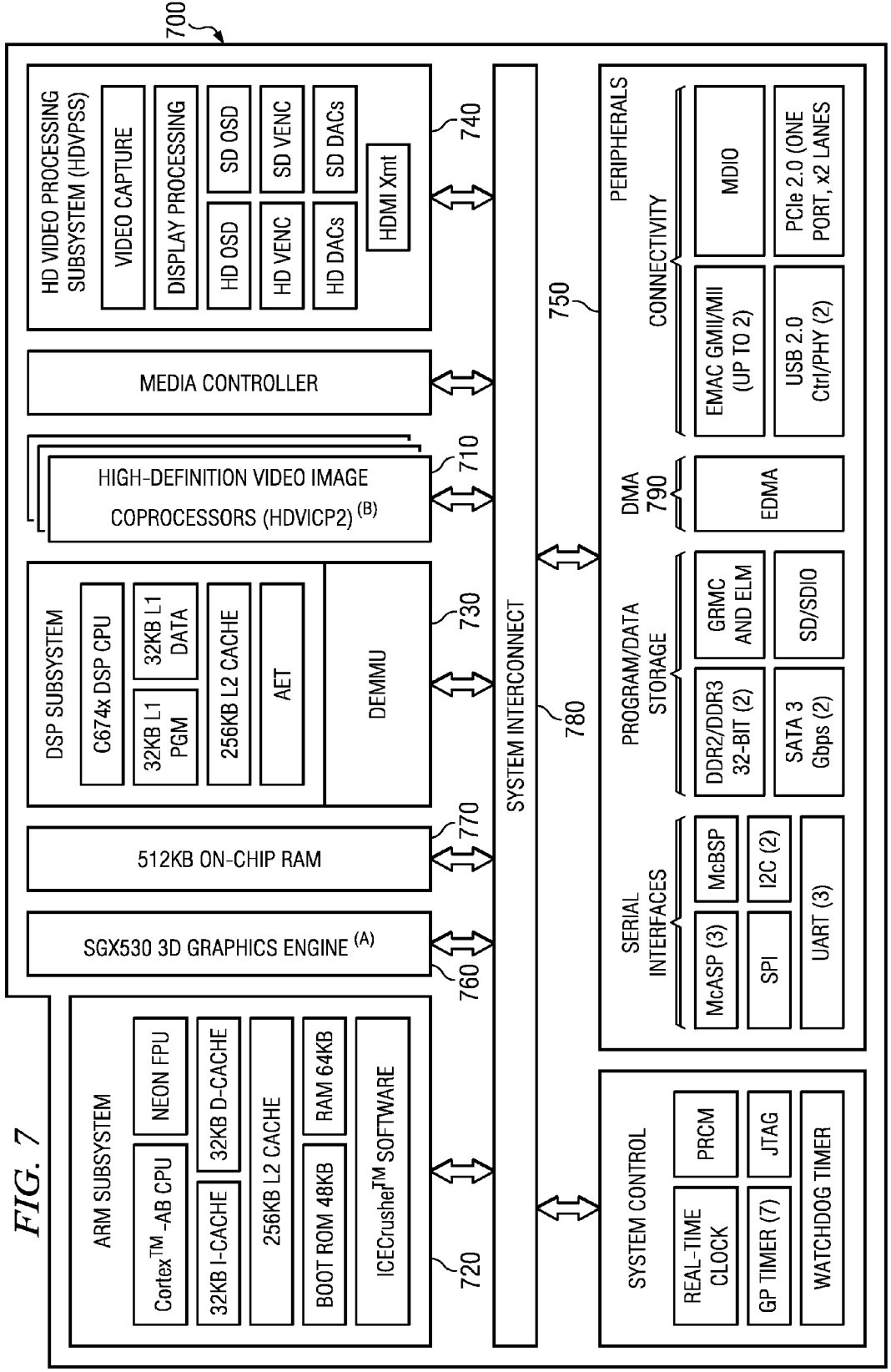
FIG. 7 is a block diagram of an SoC that may include an embodiment of the invention.

FIG. 7 is a block diagram of an example SoC 700 that may include an embodiment of the invention. This example SoC is representative of one of a family of DaVinci™ Digital Media Processors, available from Texas Instruments, Inc. This example is described in more detail in "TMS320DM816x DaVinci Digital Media Processors Data Sheet, SPRS614", March 2011 and is described briefly below.

The Digital Media Processors (DMP) 700 is a highly-integrated, programmable platform that meets the processing needs of applications such as the following: Video Encode/Decode/Transcode/Transrate, Video Security, Video Conferencing, Video Infrastructure, Media Server, and Digital Signage, etc. DMP 700 may include multiple operating systems support, multiple user interfaces, and high processing performance through the flexibility of a fully integrated mixed processor solution. The device combines multiple processing cores with shared memory for programmable video and audio processing with a highly-integrated peripheral set on common integrated substrate.

DMP 700 may include up to three high-definition video/imaging coprocessors (HDVICP2) 710. Each coprocessor can perform a single 1080p60 H.264 encode or decode or multiple lower resolution or frame rate encodes/decodes. Multichannel HD-to-HD or HD-to-SD transcoding along with multi-coding are also possible.

Programmability is provided by an ARM® Cortex™ A8 RISC CPU 720, TI C674x VLIW floating-point DSP core 730, and high-definition video/imaging coprocessors 710. The ARM® allows developers to keep control functions separate from A/V algorithms programmed on the DSP and coprocessors, thus reducing the complexity of the system software. The ARM® Cortex™-A8 32-bit RISC microprocessor with NEON™ floating-point extension includes: 32K bytes (KB) of instruction cache; 32 KB of data cache; 256 KB of L2 cache; 48 KB of Public ROM and 64 KB of RAM.

A rich peripheral set provides the ability to control external peripheral devices and communicate with external processors. The peripheral set includes: HD Video Processing Subsystem (HDVPSS) 740, which provides output of simultaneous HD and SD analog video and dual HD video inputs, and an array of peripherals 750 that may include various combinations of devices, such as: up to two Gigabit Ethernet MACs (10/100/1000 Mbps) with GMII and MDIO interface; two USB ports with integrated 2.0 PHY; PCIe® port x2 lanes GEN2 compliant interface, which allows the device to act as a PCIe® root complex or device endpoint; one 6-channel McASP audio serial port (with DIT mode); two dual-channel McASP audio serial ports (with DIT mode); one McBSP multichannel buffered serial port; three UARTs with IrDA and CIR support; SPI serial interface; SD/SDIO serial interface; two I2C master/slave interfaces; up to 64 General-Purpose I/O (GPIO); seven 32-bit timers; system watchdog timer; dual DDR2/3 SDRAM interface; flexible 8/16-bit asynchronous memory interface; and up to two SATA interfaces for external storage on two disk drives, or more with the use of a port multiplier.

HD Video Processing Subsystem (HDVPSS) 740 includes four video input ports that operate in conjunction with DMA engine 790 to receive streams of multiplexed video data, demultiplex and capture video frames, and transfer the capture frames using descriptor lists as described in more detail above.

DMP 700 may also include an SGX530 3D graphics engine 760 to enable sophisticated GUIs and compelling user interfaces and interactions. Additionally, DMP 700 has a complete set of development tools for both the ARM and DSP which include C compilers, a DSP assembly optimizer to simplify programming and scheduling, and a Microsoft® Windows® debugger interface for visibility into source code execution.

The C674x DSP core 730 is the high-performance floating-point DSP generation in the TMS320C6000™ DSP platform. The C674x floating-point DSP processor uses 32 KB of L1 program memory and 32 KB of L1 data memory. Up to 32 KB of DP can be configured as program cache. The remaining is non-cacheable no-wait-state program memory. Up to 32 KB of L1D can be configured as data cache. The remaining is non-cacheable no-wait-state data memory. The DSP has 256 KB of L2 RAM, which can be defined as SRAM, L2 cache, or a combination of both. All C674x L3 and off-chip memory accesses are routed through an MMU.

On-chip shared random access memory (RAM) 770 is accessible by ARM processor 720 and DSP processor 730 via system interconnect 780. System interconnect includes an IPC mechanism for passing messages and initiating interrupts between ARM processor 720 and DSP processor 730.

The device package has been specially engineered with Via Channel™ technology. This technology allows 0.8-mm pitch PCB feature sizes to be used in this 0.65-mm pitch package, and substantially reduces PCB costs. It also allows PCB routing in only two signal layers due to the increased layer efficiency of the Via Channel™ BGA technology.

Figure 8:
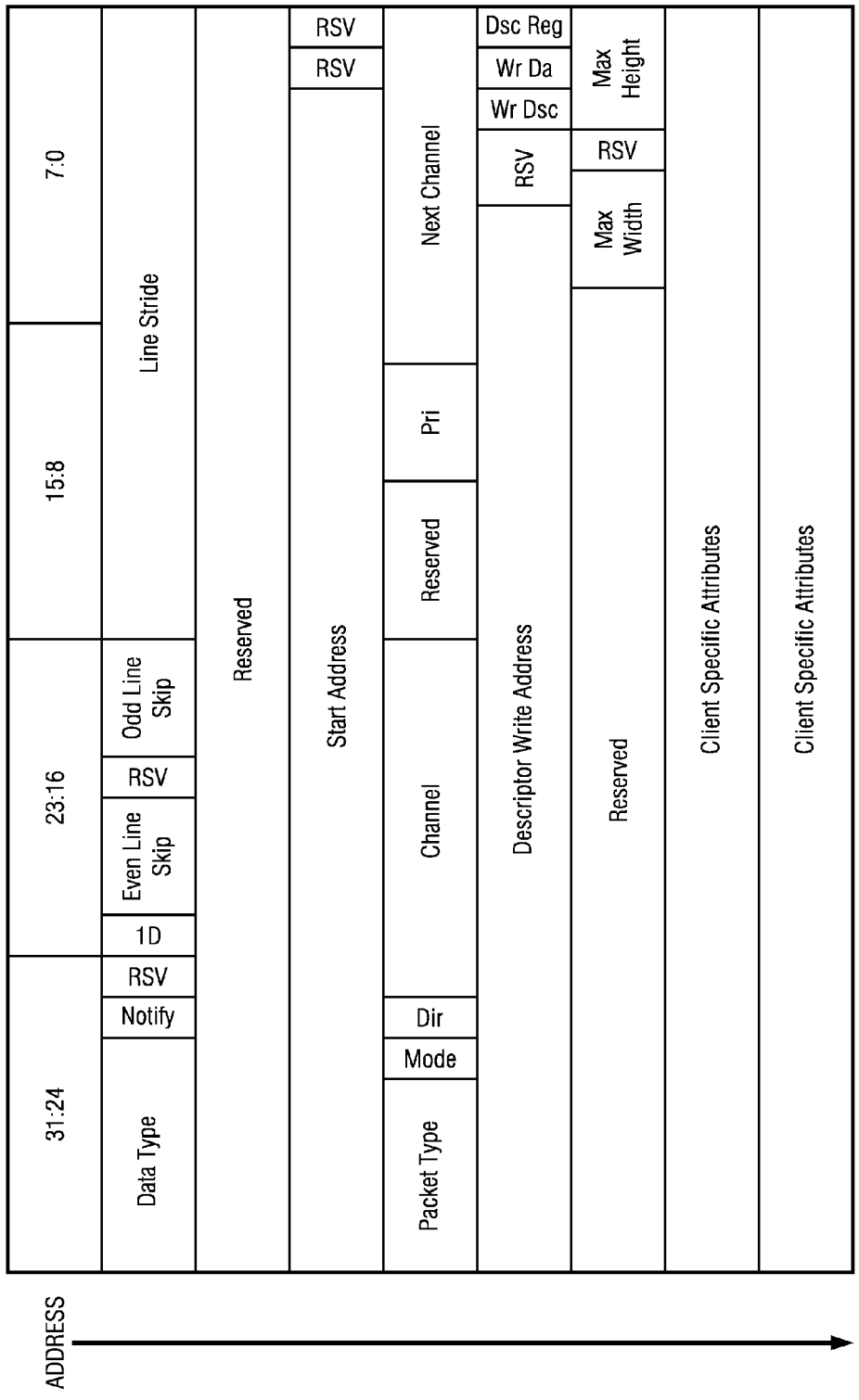
FIGS. 8-9 illustrate data descriptors for the SoC of FIG. 7.
Figure 9:
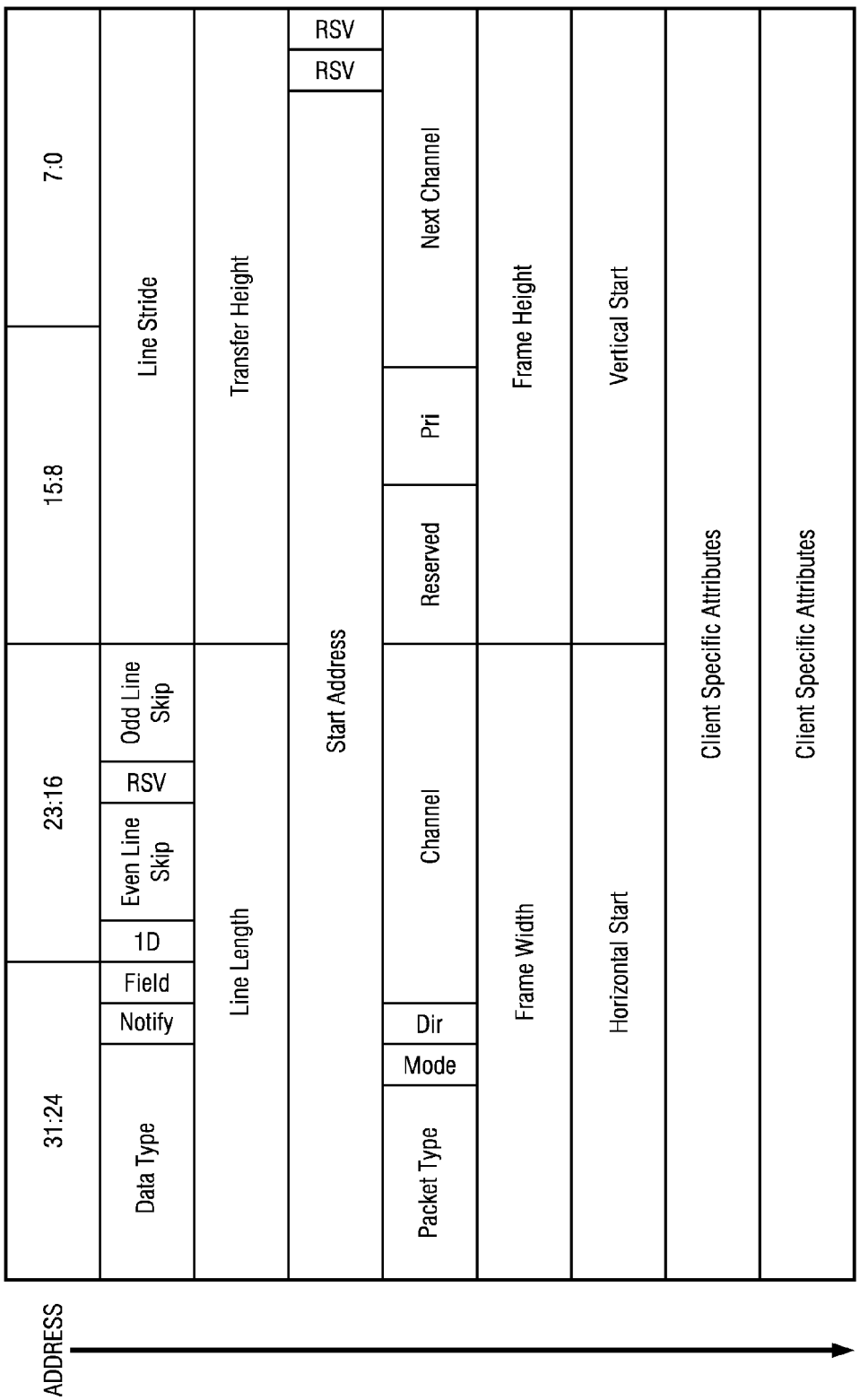

FIG. 8 illustrates an output data descriptor for the SoC of FIG. 7. An outbound descriptor is used during capture to move data from the video port to memory. FIG. 9 illustrates an input data descriptor for the SoC of FIG. 7. An inbound descriptor is used to move data from the memory to another location, such as for display.

The descriptors of FIGS. 8-9 are for example only. Other embodiments of the invention may use different descriptor arrangements and configurations.

Other Embodiments

While the invention has been described with reference to illustrative embodiments, this description is not intended to be construed in a limiting sense. Various other embodiments of the invention will be apparent to persons skilled in the art upon reference to this description. For example, while multiplexed video input streams are described, other embodiments of the invention may be used for systems that provide a number of non-multiplexed video streams that must be captured and managed in a manner similar to that described herein. For multiplexed systems, various configurations of multiplexors may be used, for example, 4:1, 8:1, 16:1, etc. that are compatible with a video input port of the Soc. DMA engines having different list processing features than described herein may be used as long as it provides a mechanism to add elements to a list that controls transfer of completed frame buffers.

While an initial descriptor list having two descriptors for each channel have been described herein, other embodiments of DMA engines may by configured to accept more than two descriptors per channel. In such embodiments, the interrupt timer period may be extended accordingly.

Embodiments of the system and methods described herein may be provided on any of several types of digital systems: digital signal processors (DSPs), general purpose programmable processors, application specific circuits (ASIC), or systems on a chip (SoC) such as combinations of a DSP and a reduced instruction set (RISC) processor together with various specialized accelerators. An ASIC or SoC may contain one or more megacells which each include custom designed functional circuits combined with pre-designed functional circuits provided by a design library. DMA engines that support linked list parsing and event triggers may be used for moving blocks of data.

Embodiments of the invention may be used for systems in which multiple monitors are used, such as a computer with two or more monitors. Embodiments of the system may be used for video surveillance systems, conference systems, etc. that may include multiple cameras or other input devices and/or multiple display devices. Embodiments of the invention may be applied to more than two processors in an SoC.

A stored program in an onboard or external (flash EEP) ROM or FRAM may be used to implement aspects of the video processing. Analog-to-digital converters and digital-to-analog converters provide coupling to the real world, modulators and demodulators (plus antennas for air interfaces) can provide coupling for waveform reception of video data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the previous discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for capturing video frames from a plurality of video channels, the method comprising:
   forming a list of a least two descriptors for each of the plurality of video channels in a memory accessible to a direct memory access (DMA) engine, wherein a first descriptor and a second descriptor are programmed for each video channel to define a storage location for a sequential frame of video data for the channel;
   capturing video data from the plurality of video channels, wherein for each video channel, video frames are received at a frame rate for that video channel;
   storing captured video data in a location in a memory of the first descriptor programmed for the corresponding video channel;
   upon storing video data of a complete video frame of a corresponding video channel updating the second descriptor programmed for the corresponding video channel to indicate storing a complete frame of the corresponding video channel;
   periodically checking status of second descriptors for each of the plurality of video channels to identify video channels having a stored complete frame of video data, the periodicity less often than once per each completed frame of the plurality of video channels; and
   selecting the identified stored complete video frames for additional data processing.

2. The method of claim 1, wherein:
   said step of updating the second descriptors comprises:
   interrupting a control processor at a periodic rate.

3. The method of claim 2, wherein the periodic rate is higher than a maximum frame rate for the plurality of video channels.

4. The method of claim 2, wherein the periodic rate is approximately equal to twice a maximum frame rate for the plurality of video channels.

5. An apparatus for capturing video frames from a plurality of video channels, the apparatus comprising:
   a video port configured to receive the plurality of video channels, wherein the video port is configured to capture sequential video data from each of the plurality of video channels;
   a memory subsystem coupled to the input port; and
   a direct memory access (DMA) engine coupled to the video port and to the memory subsystem, wherein the DMA engine is configured to:
   transfer captured sequential video data to a designated frame buffer location in the memory subsystem in accordance with a first data description programmed for the corresponding video channel;
   upon storing video data of a complete video frame of a corresponding video channel updating a second descriptor programmed for the corresponding video channel to indicate storing a complete frame of the corresponding video channel;
   periodically checking status of second descriptors for each of the plurality of video channels to identify video channels having a stored complete frame of video data, the periodicity less often than once per each completed frame of the plurality of video channels; and
   transferring the identified stored complete video frames.

6. The apparatus of claim 5, further comprising:
   a processor operable to process application software stored in the memory subsystem; and an interrupt generator coupled to the processor configured to periodically interrupt the processor; and
   wherein the application software is configured to:
   create the initial first and second data descriptors for each video channel; and
   update the second descriptors in response to each periodic interrupt.

7. The apparatus of claim 6, wherein the periodic rate is higher than a maximum frame rate for the plurality of video channels.

8. The apparatus of claim 6, wherein the periodic rate is approximately equal to twice a maximum frame rate for the plurality of video channels.

9. The apparatus of claim 6 being comprised on a single integrated circuit chip.

* * * * *